F. NEARING.
ROTARY ENGINE.
APPLICATION FILED MAY 20, 1910.

968,786.

Patented Aug. 30, 1910.

3 SHEETS—SHEET 3.

WITNESSES:
Henry C. Duncan
Frank J. Hendrick

INVENTOR
Frank Nearing

UNITED STATES PATENT OFFICE.

FRANK NEARING, OF NEW YORK, N. Y.

ROTARY ENGINE.

968,786.  Specification of Letters Patent.  Patented Aug. 30, 1910.

Application filed May 20, 1910. Serial No. 562,453.

*To all whom it may concern:*

Be it known that I, FRANK NEARING, a citizen of the United States, residing at 315 West Fifty-eighth street, borough of Manhattan, city of New York, and county of New York, and State of New York, have invented a new and useful Rotary Engine, of which the following is a specification.

Figure 1:
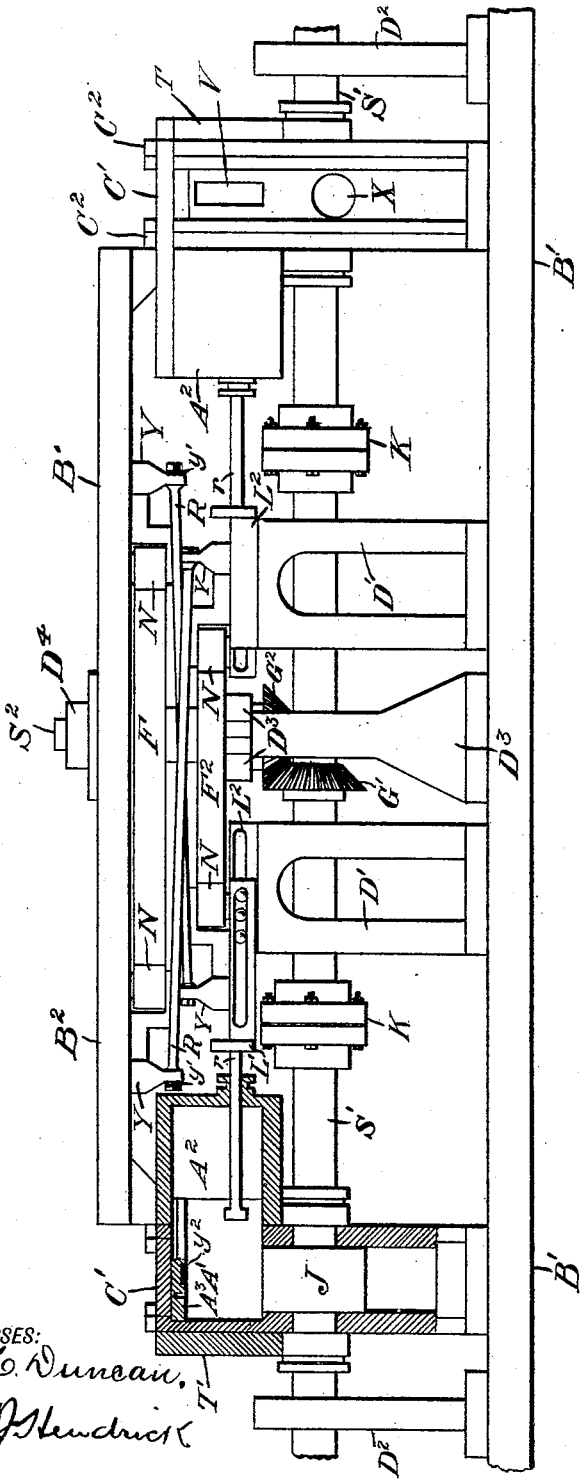
Figure 2:
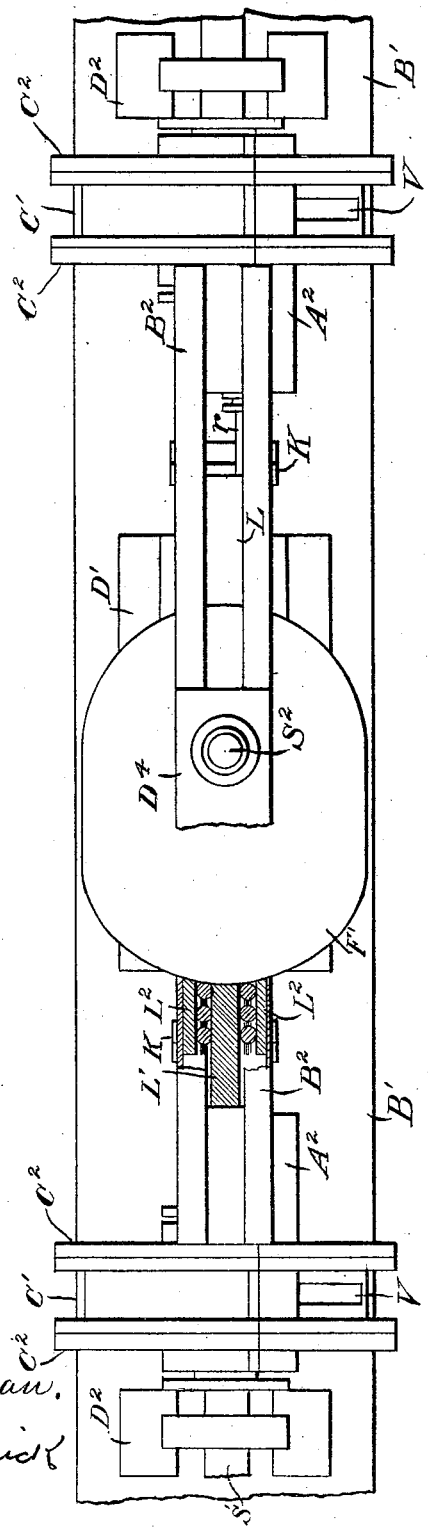
Figures 3, 4:
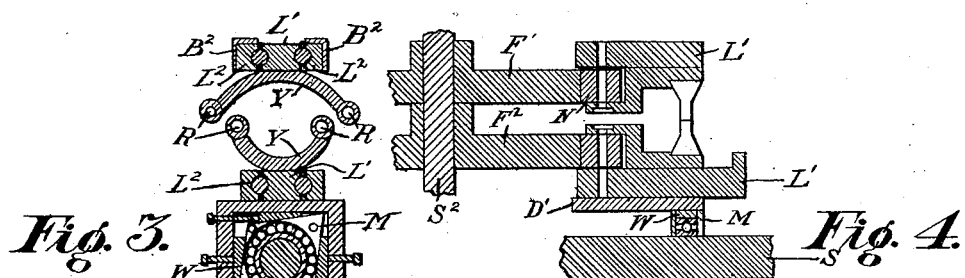
Figures 5, 6:
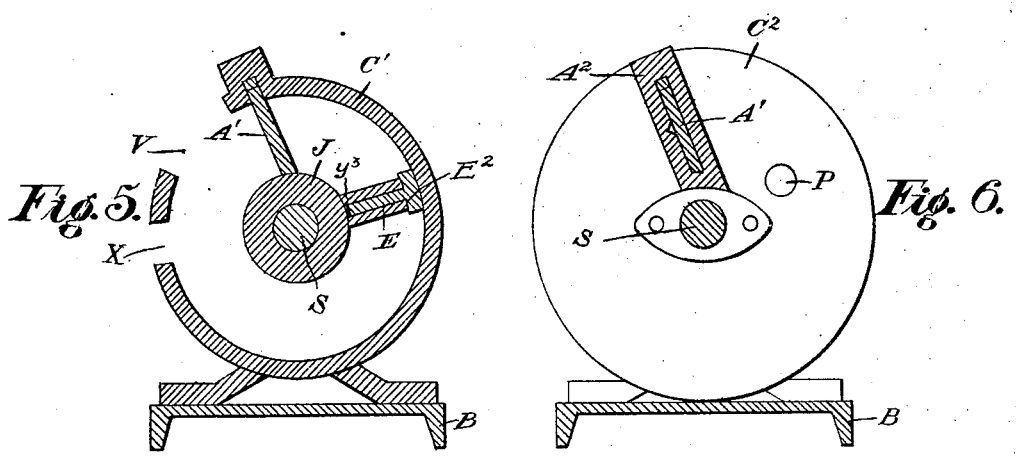
Figure 7:
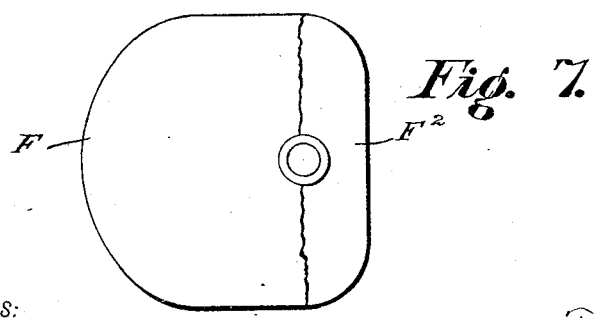

My invention relates to improvements in rotary engines, to be operated by steam or any vapor, gas, (explosive or otherwise) or liquid; in which there are two cylinders in the same plane with coupled shafts the cylinders being set on a rigid base; a perpendicular shaft operated by the main shaft by bevel gears. On this perpendicular shaft two eccentric disks are fixed for operating the abutments. Each disk is semicircular for a portion of its perimeter. One disk is flattened to permit the withdrawal of the abutments; the other is of varying increased radius so as to form the complement of the flattened disk to equal the normal diameter of the semi-circle. Against either side of each disk is a friction roller set in a cross-head running in ball bearings between guides. The cross heads of the one disk are connected by rods to the cross heads on the opposite sides of the other disk. The cross heads working on the enlarged and flattened disk portions cause the withdrawal and the semi-circular portion of the flattened disk the replacing of the abutments. And the objects of my improvements are: first: a rotary engine with continuous pressure acting throughout the entire revolution; with independent ball bearings to take the strain and wear from the cylinder heads. Second: the free and positive movement of the abutments. Third: the elimination of friction wherever possible. I attain these objects by the mechanism illustrated in the accompanying drawings in which:

Figure 1 is a side elevation of the entire machine, with one cylinder cut away showing the abutment, the interior drum and the interior of the abutment case; one guide is also cut away showing the side of cross-head and the balls. Fig. 2 is a plan view with a portion of the top brace cut away to show the enlarged disk and one of the ball bearing cross-heads and guides. Fig. 3 is a cross section through the main shaft bearings, cross-heads and guides, showing the yokes to which the connecting rods are fixed. Fig. 4 is a longitudinal section through the center of the cross-heads showing the disks on even radius. Fig. 5 is a section across center of cylinder showing the abutment, piston, exhaust and ventilation openings. Fig. 6 is an elevation of the cylinder head showing the pressure intake and a section of the abutment case and the abutment. Fig. 7 is a view of the eccentric portion of each disk wherein a straight line through the center approximates the normal diameter of the semicircle closely enough for working purposes.

Similar letters refer to similar parts throughout the entire views.

B' represents the base consisting of a channel section of steel or other strong material. At equal distances from the center are the two cylinders C', C', connected by the coupled shafts S', S', within the cylinders C', C', fixed upon the shaft S' are the drums J and the pistons E which are set upon opposite sides of the shaft S'.

The pistons E are in two parts the portions marked $E^2$ being separate and pressed against the inner perimeters of the cylinders C' C' by a spring $y^3$ to prevent escape of pressure and take up wear. Between the cylinders are the two bearing stands D' D' which are extended toward the center and upon the top of which are mounted the guides $L^2$ for the lower cross-heads.

A short distance outside the cylinders are placed the bearing stands $D^2$, $D^2$ supporting the outer ends of the shaft S'. These bearings are similar to the other main shaft bearings, except the extension for the guides.

$D^3$ at the center is the lower bearing of the perpendicular shaft $S^2$.

$D^4$ is the top bearing of the shaft $S^2$.

Between the cylinders C', C' and the bearing stands D' D' are the couplings K, K, which are packed somewhat apart and will admit of some contraction or extension to allow a change in the adjustments of the cylinders C', C', and the removal of one cylinder if desired.

On and near the center of the main shaft S' is set the bevel gear G' which engages with a similar bevel gear $G^2$ on the perpendicular shaft $S^2$ which gears operate the disks F' $F^2$ which in turn push against the rollers N, N, N, N, causing the cross heads L', L', L', L, to move forward and back between the guides $L^2$, $L^2$, $L^2$, $L^2$; the rods R, R, R, R holding the cross-heads so that the rollers are constantly against the rims of the disks. At one end of each rod is a spring $y'$ permitting a slight variation in case of a little inequality in the distance across the eccentric portions of the disks. The cross-heads $L'$ and the guides $L^2$ are grooved to fit the balls which are provided with a separator as shown. The abutment rod $r$ is fixed in the end of each lower cross head and is upset at the other end to fit in a slot in the abutment.

The abutment $A'$ is in two parts. The upper part $A^3$ is removable and is set on pins at each end as shown where cut away, and is pressed outward by the spring $y^2$ to hold the lower portion $A$ firmly against the drum $J$.

The cylinders $C'$, $C'$ are provided with an opening $V$ between the exhaust and the abutment groove to allow the escape of any pressure that might interfere with the movement of the abutments $A$. The outer cylinder head has a slot to allow the entrance of the abutment and is provided with a cover $T$.

A brace $B^2$ $B^2$ made of two angles connects the cylinders at top: upon this brace is mounted the upper bearing of the perpendicular shaft $S^2$ which bearing is marked $D^4$ and the guides $L^2$, $L^2$ for the cross-heads working on disk $F'$ are also fixed between the two angles forming brace $B^2$, $B^2$ as shown in Figs. 2 and 3. The yokes $Y$, to which the rods $R$ are attached, are firmly fixed to the cross-heads one pair of rods being separated sufficiently to clear the other pair.

The main shaft bearings $D'$, $D'$, $D^2$, $D^2$ are composed of a collar on the main shaft $S'$. This collar is grooved to fit the balls, as shown, and the ball case $M$ which is in two halves and held together by screws. The halves are packed slightly apart and may be drawn together by screws to take up wear, and can be taken apart to allow the removal or replacing of the balls, and the wedges $W$, $W$, $W$, $W$ which allow either a horizontal or vertical movement for adjustment. These wedges $W$, $W$, $W$, $W$ are provided with adjusting and set screws as shown.

In operation the pressure enters at $P$ forcing the piston of the cylinder to which it is applied around through the semi-revolution until the exhaust $X$ is reached at which point the disks are at the normal radius and the abutment of the second cylinder placed. The pressure is then applied to the second cylinder and the operation repeated and continued. When the disks are both at the normal (semi-circular) radius both abutments are placed to close the interiors of the cylinders but the abutment against which pressure has last re-acted and has been exhausted is withdrawn by the action of the disks operating through the rollers, on the crossheads to the abutment.

Having thus described my invention, what I claim as new and desire to secure by Letters Patent is:

1. In a rotary engine, the combination of the two cylinders mounted on a rigid base and provided with air openings, intake and exhaust ports, and movable abutments, of the coupled shafts mounted in independent bearings and carrying within said cylinders drums having pistons mounted thereon.

2. A rotary engine comprising a cylinder containing a longitudinally sliding abutment and having mounted therein a horizontal shaft carrying a two part piston, in combination with a vertical shaft carrying two eccentric disks and connected with said horizontal shaft by means of bevel gears; one of said disks being flattened for a portion of the perimeter while the other has a corresponding portion of increased radius and connecting means whereby the rotation of said disks causes the reciprocation of said abutment.

3. In a rotary engine having a cylinder containing a longitudinally moving abutment, mechanism for operating said abutment consisting of the vertical shaft; the eccentric disks mounted thereon; the friction rollers bearing against said disks and mounted on crossheads moving in ball bearings between the guides, and the rods connecting the crossheads on one side of one disk with the crossheads on the opposite side of the other disk, whereby the rollers are held constantly against the edges of said disks, substantially as described.

FRANK NEARING.

Witnesses:
JOSEPH FIELL,
GEO. LARSEN, Jr.